(12) United States Patent
Sokkalal et al.

(10) Patent No.: US 11,372,951 B2
(45) Date of Patent: Jun. 28, 2022

(54) PROXY LICENSE SERVER FOR HOST-BASED SOFTWARE LICENSING

(71) Applicant: EMC IP Holding Company LLC, Hopkinton, MA (US)

(72) Inventors: Mahalakshmi Sokkalal, Bangalore (IN); Maneesh Pusalkar, Pune (IN); Vigneshwaran Rajasekaran, Bangalore (IN); Surendra Singh Chauhan, Bangalore (IN); Udit Tyagi, Bangalore (IN); Nagaveni Bhavi, Bagalkot (IN); Gopinath Marappan, Coimbatore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 307 days.

(21) Appl. No.: 16/711,742

(22) Filed: Dec. 12, 2019

(65) Prior Publication Data

US 2021/0182365 A1 Jun. 17, 2021

(51) Int. Cl.
*G06F 21/10* (2013.01)
*G06F 13/40* (2006.01)
*G06F 21/12* (2013.01)

(52) U.S. Cl.
CPC ........ *G06F 21/105* (2013.01); *G06F 13/4027* (2013.01); *G06F 13/4072* (2013.01); *G06F 21/12* (2013.01); *G06F 2221/0773* (2013.01)

(58) Field of Classification Search
CPC ............... G06F 21/105; G06F 13/4027; G06F 13/4072; G06F 21/12; G06F 2221/0773
See application file for complete search history.

(56) References Cited

U.S. PATENT DOCUMENTS 6,567,397 B1 5/2003 Campana et al.
6,687,746 B1 2/2004 Shuster et al.
(Continued)

FOREIGN PATENT DOCUMENTS

EP 2011-03-31 A1 8/2011
WO 2011/037720 A1 3/2011

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — David Garcia Cervetti
(74) *Attorney, Agent, or Firm* — Ryan, Mason & Lewis, LLP

(57) ABSTRACT

An apparatus includes a first host device comprising a first multi-path input-output (MPIO) driver configured to discover additional MPIO drivers of additional host devices of an enterprise system that utilize a given piece of software for controlling delivery of input-output operations to a storage system over selected ones of a plurality of paths through a network, the given software being licensed by a license server external to the enterprise system. The first MPIO driver is also configured to obtain a pool of licenses for the given software from the license server and to receive from a given one of the additional MPIO drivers a request for a license to utilize the given software. The first MPIO driver is further configured to check out one of the pool of licenses and enable use of the given software by the given additional MPIO based at least in part on the checked-out license.

20 Claims, 5 Drawing Sheets

(56) References Cited

U.S. PATENT DOCUMENTS

| | | |
|---|---|---|
| 6,697,875 B1 | 2/2004 | Wilson |
| 6,996,741 B1* | 2/2006 | Pittelkow ............ G06F 11/2092 |
| | | 714/4.2 |
| 7,003,688 B1* | 2/2006 | Pittelkow ............ G06F 11/2089 |
| | | 714/4.2 |
| 7,069,468 B1* | 6/2006 | Olson ................. G06F 11/2092 |
| | | 714/4.2 |
| 7,454,437 B1 | 11/2008 | Lavallee et al. |
| 7,617,292 B2 | 11/2009 | Moore et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,843,906 B1* | 11/2010 | Chidambaram .... H04L 49/9094 |
| | | 370/386 |
| 7,904,681 B1 | 3/2011 | Bappe et al. |
| 7,925,872 B2 | 4/2011 | Lai et al. |
| 8,032,409 B1* | 10/2011 | Mikurak ............... G06Q 30/00 |
| | | 705/14.39 |
| 8,285,825 B1 | 10/2012 | Nagaraj et al. |
| 8,321,948 B2 | 11/2012 | Robinson et al. |
| 8,359,392 B2 | 1/2013 | Garbajs et al. |
| 8,494,966 B2* | 7/2013 | Xu ........................... H04L 63/12 |
| | | 705/57 |
| 8,510,596 B1* | 8/2013 | Gupta ................. G06F 11/1004 |
| | | 714/21 |
| 8,516,090 B1* | 8/2013 | Welch .................... G06F 21/10 |
| | | 709/221 |
| 8,520,533 B1* | 8/2013 | Gill ..................... H04L 43/0811 |
| | | 370/242 |
| 8,751,698 B1* | 6/2014 | Sachdev ............. G06F 11/0781 |
| | | 710/16 |
| 8,769,299 B1* | 7/2014 | Dickson ................ G06F 21/105 |
| | | 713/189 |
| 8,825,919 B1 | 9/2014 | Lim et al. |
| 8,839,444 B2* | 9/2014 | Roshchin .............. G06F 21/105 |
| | | 726/26 |
| 8,874,746 B1 | 10/2014 | Gonzalez |
| 8,955,099 B1* | 2/2015 | Varanasi ............... G06F 21/604 |
| | | 713/182 |
| 8,984,220 B1* | 3/2015 | Gill ...................... G06F 11/079 |
| | | 711/100 |
| 9,026,694 B1* | 5/2015 | Davidson .............. G06F 9/505 |
| | | 710/38 |
| 9,400,611 B1 | 7/2016 | Raizen |
| 9,594,780 B1 | 3/2017 | Esposito et al. |
| 9,647,933 B1* | 5/2017 | Tawri .................. H04L 29/12839 |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 11,314,868 B2 | 4/2022 | Hou .................... G06F 11/1441 |
| 2002/0103923 A1 | 8/2002 | Cherian et al. |
| 2003/0037061 A1* | 2/2003 | Sastri .................... G06F 3/0601 |
| 2004/0010563 A1 | 1/2004 | Forte et al. |
| 2004/0019566 A1* | 1/2004 | Foster ................... G06F 21/105 |
| | | 705/59 |
| 2004/0153416 A1* | 8/2004 | Fujimoto ............... G06F 21/105 |
| | | 705/59 |
| 2005/0144475 A1* | 6/2005 | Sakaki .................... H04L 63/20 |
| | | 713/189 |
| 2005/0289072 A1* | 12/2005 | Sabharwal ............ G06F 21/121 |
| | | 705/59 |
| 2006/0277383 A1 | 12/2006 | Hayden et al. |
| 2006/0287961 A1* | 12/2006 | Mori ....................... G06F 21/10 |
| | | 705/59 |
| 2007/0250713 A1* | 10/2007 | Rahman ................. H04W 12/50 |
| | | 713/171 |
| 2007/0255813 A1* | 11/2007 | Hoover ................. G06F 9/5061 |
| | | 709/223 |
| 2008/0043973 A1 | 2/2008 | Lai et al. |
| 2008/0082976 A1 | 4/2008 | Steinwagner et al. |
| 2008/0086614 A1* | 4/2008 | Canis .................... G06F 21/121 |
| | | 711/E12.015 |
| 2008/0243699 A1* | 10/2008 | Hilerio .................. G06F 21/105 |
| | | 705/58 |
| 2009/0138975 A1* | 5/2009 | Richardson ............ G06F 21/73 |
| | | 726/32 |
| 2009/0249329 A1 | 10/2009 | Dash |
| 2009/0300641 A1 | 12/2009 | Friedman et al. |
| 2009/0328225 A1 | 12/2009 | Chambers et al. |
| 2010/0205303 A1* | 8/2010 | Chaturvedi ............. G06F 21/10 |
| | | 709/226 |
| 2010/0229240 A1* | 9/2010 | Tanaka .................... G06F 21/10 |
| | | 726/26 |
| 2010/0293272 A1* | 11/2010 | Karunakaran ........ H04W 24/04 |
| | | 709/224 |
| 2010/0293619 A1* | 11/2010 | Hayami ................. G06F 21/121 |
| | | 726/27 |
| 2011/0047624 A1* | 2/2011 | Vedantam .............. G06F 21/10 |
| | | 726/26 |
| 2011/0072522 A1* | 3/2011 | Koka ..................... G06F 21/105 |
| | | 726/31 |
| 2011/0197027 A1 | 8/2011 | Balasubramanian et al. |
| 2011/0296230 A1 | 12/2011 | Chen et al. |
| 2012/0079393 A1* | 3/2012 | Raithinam .............. H04L 67/36 |
| | | 715/744 |
| 2012/0254567 A1* | 10/2012 | Umbehocker ......... G06F 3/0604 |
| | | 711/E12.002 |
| 2012/0257240 A1* | 10/2012 | Yuki ....................... G06F 21/10 |
| | | 358/1.14 |
| 2012/0331528 A1* | 12/2012 | Fu ........................... H04L 67/10 |
| | | 726/4 |
| 2013/0117766 A1* | 5/2013 | Bax ....................... G06F 9/4405 |
| | | 719/323 |
| 2013/0191923 A1* | 7/2013 | Abuelsaad ............. G06F 21/10 |
| | | 726/26 |
| 2013/0305394 A1* | 11/2013 | Nozue ................... G06F 21/105 |
| | | 726/30 |
| 2014/0189680 A1* | 7/2014 | Kripalani ................. G06F 8/61 |
| | | 717/176 |
| 2014/0344942 A1* | 11/2014 | Headley ................ G06F 21/121 |
| | | 726/26 |
| 2015/0222705 A1 | 8/2015 | Stephens |
| 2015/0242862 A1* | 8/2015 | Rupple ................. G06Q 30/018 |
| | | 705/317 |
| 2015/0370575 A1* | 12/2015 | Tonry .................... G06F 9/4406 |
| | | 713/2 |
| 2016/0092136 A1 | 3/2016 | Balakrishnan et al. |
| 2016/0117113 A1 | 4/2016 | Li et al. |
| 2016/0162666 A1* | 6/2016 | Casey ................. G06F 9/45558 |
| | | 726/29 |
| 2016/0173947 A1* | 6/2016 | Cho ...................... H04N 21/433 |
| | | 725/31 |
| 2016/0335003 A1* | 11/2016 | Ahmed ................... G06F 11/10 |
| 2017/0061105 A1* | 3/2017 | Minagawa ............. G06F 21/10 |
| 2017/0235507 A1* | 8/2017 | Sinha .................... G06F 11/2069 |
| | | 711/114 |
| 2017/0337356 A1* | 11/2017 | Cho ........................ G06F 21/10 |
| 2018/0189635 A1 | 7/2018 | Olarig et al. |
| 2018/0210665 A1* | 7/2018 | Anumula ............... G06F 3/0665 |
| 2018/0276018 A1* | 9/2018 | Delaney ............... G06F 9/45558 |
| 2018/0322599 A1* | 11/2018 | Srivastava ............. H04L 67/025 |
| 2018/0324216 A1* | 11/2018 | Cross ...................... H04L 63/20 |
| 2019/0005205 A1* | 1/2019 | Dargar .................. G06F 21/105 |
| 2019/0095299 A1 | 3/2019 | Liu et al. |
| 2019/0108888 A1 | 4/2019 | Sarkar et al. |
| 2019/0114397 A1* | 4/2019 | Terry ...................... H04L 63/20 |
| 2020/0034258 A1* | 1/2020 | Avraham .............. G06F 11/2094 |
| 2020/0089843 A1* | 3/2020 | Flores ................... H04L 41/082 |
| 2020/0167444 A1* | 5/2020 | Singh ........................ G06F 8/65 |
| 2020/0201614 A1* | 6/2020 | Wang ................... G06F 16/2365 |
| 2020/0349238 A1* | 11/2020 | Tyagi ..................... G06F 16/22 |
| 2020/0349239 A1* | 11/2020 | Tyagi ................... G06F 21/105 |
| 2020/0379857 A1* | 12/2020 | Shah ..................... G06F 13/4221 |
| 2021/0072931 A1* | 3/2021 | Matsushima ............ H04N 1/00 |

(56) References Cited

U.S. PATENT DOCUMENTS

2021/0073354 A1\* 3/2021 Tyagi .................. G06F 11/3668
2021/0182365 A1\* 6/2021 Sokkalal ................. G06F 21/12

OTHER PUBLICATIONS

NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
DELL EMC, "DELL EMC SC Series Storage and Microsoft Multipath I/O," CML 1004, Jul. 2018, 36 pages.
VMware, Inc. "VMware VMFS Volume Management," 2009, 8 pages.
U.S. Appl. No. 15/795,653 filed in the name of Maneesh Pusalkar et al. filed Oct. 27, 2017 and entitled "Storage System with Network-Wide Configurable Device Names."
U.S. Appl. No. 16/142,274 filed in the name of Sanjib Mallick et al. filed Sep. 26, 2018 and entitled "Host Device with Multi-Path Layer Implementing Automatic Standby Setting for Active-Active Configuration."
U.S. Appl. No. 13/249,634 filed in the name of Peter A. Loconto Jr. et al. filed Sep. 30, 2011 and entitled "License, Management and Compliance Virtual Appliance."

\* cited by examiner

US 11,372,951 B2

PROXY LICENSE SERVER FOR HOST-BASED SOFTWARE LICENSING

FIELD

The present invention relates generally to the field of information processing, and more particularly to techniques for managing software licensing for host devices.

BACKGROUND

Software licensing may utilize various electronic licensing models, including served, unserved and classic licensing models. Served licensing models utilize a license server that issues licenses to license modules resident on the devices being licensed. Unserved licensing models do not utilize a license server, and instead issues licenses to specific devices. A classic licensing model issues license keys that can be installed on devices. These and other electronic licensing models, however, may be subject to license leakage where the licensing models are reverse-engineered affecting the integrity of the licenses.

SUMMARY

Illustrative embodiments of the present disclosure provide techniques for host-based software licensing.

In one embodiment, an apparatus comprises a first host device of a plurality of host devices in an enterprise system configured to communicate over a network with a storage system comprising a plurality of storage devices. The first host device comprises a first multi-path input-output driver configured to discover one or more additional multi-path input-output drivers of one or more additional ones of the plurality of host devices of the enterprise system that utilize a given piece of software for controlling delivery of input-output operations to the storage system over selected ones of a plurality of paths through the network, the given piece of software being licensed by a license server external to the enterprise system. The first multi-path input-output driver is also configured to obtain, from the license server, a pool of two or more licenses for the given piece of software and to receive, from a given one of the additional multi-path input-output drivers of a given one of the additional host devices, a request for a license to utilize the given piece of software. The first multi-path input-output driver is further configured to check out one of the pool of two or more licenses for the given piece of software for use by the given additional multi-path input-output driver of the given additional host device, and to enable use of the given piece of software by the given additional multi-path input-output driver of the given additional host device based at least in part on the checked-out license for the given piece of software.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
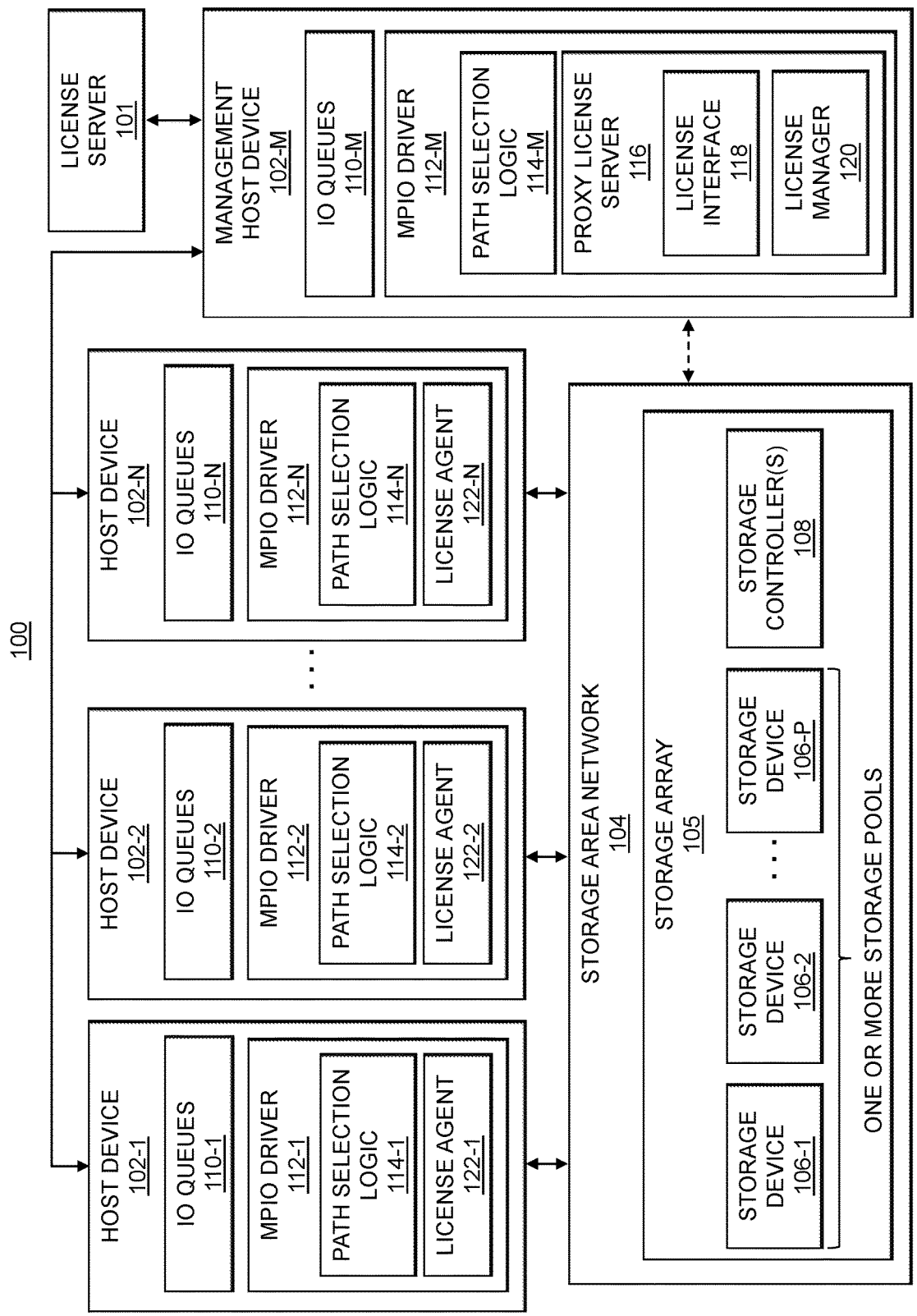
FIG. 1 is a block diagram of an information processing system for host-based software licensing of multi-path input-output drivers in an illustrative embodiment.

FIG. 1 shows an information processing system 100 configured in accordance with an illustrative embodiment. The information processing system 100 comprises a plurality of host devices 102-1, 102-2, ... 102-N and a management host device 102-M (collectively, host devices 102). The host devices 102 communicate over a storage area network (SAN) 104 with at least one storage array 105. The storage array 105 comprises a plurality of storage devices 106-1, 106-2, ... 106-P (collectively, storage devices 106) each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102-1, 102-2, . . . 102-N comprise respective sets of IO queues 110-1, 110-2, . . . 110-N and respective MPIO drivers 112-1, 112-2, . . . 112-N. The management host device 102-M also comprises IO queues 110-M and an MPIO driver 112-M. The MPIO drivers 112-1, 112-2, 112-N and 112-M (collectively, MPIO drivers 112) comprise a multi-path layer of the host devices 102. The multi-path layer provides functionality for dynamic control of one or more path selection algorithms. Such functionality is provided at least in part using respective instances of path selection logic 114-1, 114-2, . . . 114-N and 114-M implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for dynamic control of one or more path selection algorithms. Other types of MPIO drivers from other driver vendors may be suitably modified to incorporate functionality for dynamic control of one or more path selection algorithms as disclosed herein.

The term "MPIO driver" as used herein is intended to be broadly construed, and such a component is illustratively implemented at least in part as a combination of software and hardware. For example, one or more of the MPIO drivers 112 can comprise one or more software programs running on a hardware processor of one or more of the host devices 102.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. These and other algorithms are assumed to be encompassed by the term "path selection algorithm" as that term is broadly used herein.

Each IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to determine IO processing performance for each of at least a subset of the paths, and to dynamically adjust a path selection algorithm, utilized by the path selection logic 114-1 in selecting particular ones of the paths for delivery of the IO operations from the host device 102-1 to the storage array 105, based at least in part on the determined performance.

In determining IO processing performance of respective paths, the MPIO driver 112-1 obtains information such as, for example, response times or other latency measures of the respective paths. This information is illustratively referred to in the context of some embodiments herein as "path condition information," although other types of information can be used in other embodiments. Dynamic control of one or more path selection algorithms is therefore performed in some embodiments using latency measures.

The above-noted process of determining IO processing performance for each of at least a subset of the paths and dynamically adjusting a path selection algorithm utilized in selecting particular ones of the paths for delivery of the IO operations from the host device to the storage array 105 based at least in part on the determined performance are illustratively repeated in each of a plurality of intervals. The particular duration of such time periods can be a user-configurable parameter, or set by default, and can vary depending upon factors such as the desired resolution of the IO processing performance information and the amount of overhead required to determine that information.

In the FIG. 1 embodiment, the storage array 105 comprises one or more storage controllers 108. The storage controllers may maintain per-port IO processing information. Such per-port IO processing information is illustratively collected by the storage array 105, and in some embodiments may be provided to one or more of the host devices 102 for use in conjunction with path selection.

Additional components not explicitly shown in the figure, such as one or more storage caches, may also be provided in the storage array 105 for use in processing IO operations. For example, in some embodiments, each of the storage controllers 108 has a different local cache or a different allocated portion of a global cache associated therewith, although numerous alternative arrangements are possible. The storage controllers 108 can be implemented as respective storage processors, directors or other storage system components configured to control storage system operations relating to processing of IO operations.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104.

Accordingly, functionality described above in the context of the first MPIO driver 112-1 and the first host device 102-1 is assumed to be similarly performed by each of the other MPIO drivers 112-2 through 112-N and 112-M and/or more generally by their respective host devices 102-2 through 102-N and 102-M.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support host-based software licensing.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

Additional examples of processing platforms utilized to implement portions of the system 100 in illustrative embodiments will be described in more detail below in conjunction with FIGS. 4 and 5.

Software and other product licensing for MPIO drivers 112 can be a challenging task. For example, standalone software running on the host devices 102 for implementing the path selection logic 114 may rely on license keys, issued by a license server 101, that are stored in the host devices 102. Such a licensing approach, however, can be compromised through reverse engineering the electronic licensing model used by the license server 101. Electronic licensing models may be used to restrict a particular license to a specific one of the host devices 102, to specific software on one of the host devices 102 (e.g., to software for implementing path selection logic 114), to specific features of software on one of the host devices 102, etc. In an electronic licensing model, the license server 101 may generate host licenses based on unique identifiers of the host devices 102. The unique identifier of a given one of the host devices 102 may, in some cases, be based on hardware or other characteristics of that host device. Thus, each time one of the host devices 102 is re-imaged, the host license for that host device must be re-generated. Also, in such a licensing model the same host license cannot be shared across multiple ones of the host devices 102 or across platforms, as the host licenses are assumed to be tied to the unique identifiers of the host devices 102. Further, upgrades of the license server 101 in such a licensing model may cause disruption to the host devices 102 (e.g., to licensing modules resident thereon that support such a licensing model). When the host devices 102 are production hosts that deploy and host live functionality, such disruption can significantly affect performance.

Various types of electronic licensing models may be used. The "served" license model is an application-based license model which is defined according to the license server 101 that manages the allocation of licenses. The served license model is dependent on the availability of the license server 101, and if the license server 101 goes down the license will be released to a license pool. The "unserved" license model is a host-based license model, in which the physical address or other characteristics of the host devices 102 are used to generate host-specific licenses prior to use. In a "classic" license model, features of software or another type of product are encrypted and the license is stored as license keys in the host devices 102. The license key can be used for multiple installations of the software or other product. The drawback of such licensing models is that, when licensing enhancement is done, licensing modules resident in the host devices 102 have to be updated along with the software or other product in the host devices 102. This causes significant disruption, particularly where the host devices 102 are production hosts. Another drawback of such licensing models is that licenses cannot generally be shared across different ones of the host devices 102 and across different platforms used by different ones of the host devices 102. Further, such licensing models are deficient in that license renewal may not be regularly enforced thus allowing license tampering.

In some embodiments, the MPIO driver 112-M of the management host device 102-M implements a proxy license server 116 that includes a license interface module 118 and a license manager module 120. The proxy license server 116 implemented by the MPIO driver 112-M of the management host device 102-M (also referred to herein as management host 102-M), is configured to manage licensing for the MPIO drivers 112-1, 112-2, . . . 112-N of the host devices 102-1, 102-2, . . . 102-N. The host devices 102-1, 102-2, . . . 102-N are assumed to comprise production hosts in a data center or other enterprise system, with associated MPIO drivers 112-1, 112-2, . . . 112-N hosting live functionality (e.g., of path selection logic 114). The host devices 102-1, 102-2, . . . 102-N are thus also referred to herein as production hosts 102.

The proxy license server 116 implemented by the MPIO driver 112-M of the management host 102-M enables pool-based licensing for the production hosts 102 in a data center or other enterprise system as a whole, rather than relying on host-specific licensing (e.g., where host licenses are tied to unique identifiers of the production hosts 102). The proxy license server 116 implemented by the MPIO driver 112-M of the management host 102-M is configured to manage licenses for the production hosts 102 devices in the data center or other enterprise system using a license pool and a license database. Thus, the proxy license server 116 implemented by the MPIO driver 112-M of the management host 102-M performs internal key or other license management for the MPIO drivers 112 of the production hosts 102 in the data center or other enterprise system.

Advantageously, the proxy license server 116 implemented by the MPIO driver 112-M of the management host 102-M can mitigate issues associated with license leakage. The proxy license server can implement regular license renewal (e.g., once a week, once a month, etc.) for the production hosts 102. The license renewal may be initiated by the production hosts 102 or the management host 102-M to avoid license leakage, license corruption and license duplication. The proxy license server 116 also enables a loosely-coupled licensing architecture by alleviating the need for licensing agents 122 in the production hosts 102 of the data center or other enterprise system to communicate with the license server 101 external to the data center or other enterprise system in which the production hosts 102 run. This allows the license server 101 and proxy license server 116 to upgrade independently of the production hosts 102.

The proxy license server 116 may store various information relating to available licenses, license status of the production hosts 102, etc. in a host database (e.g., host database 210 shown in FIG. 2, described in further detail below). Such a host database may be implemented internal to the proxy license server 116, MPIO driver 112-M or more generally the management host 102-M, or may be implemented at least partially external to the proxy license server 116, the MPIO driver 112-M or the management host 102-M. The host database may be any type of database or other data store configured to store such information.

Although not explicitly shown in FIG. 1, one or more input-output devices such as keyboards, displays or other types of input-output devices may be used to support one or more user interfaces to the proxy license server 116 implemented by the MPIO driver 112-M of the management host 102-M (e.g., to the license interface module 118 thereof, which may provide a graphical user interface (GUI), etc.), as well as to support communication between the proxy license server 116 and other related systems and devices not explicitly shown.

The production hosts 102, as noted above, implement license agents 122. The license agents 122 are configured, in some embodiments, to persist license information provided by the license manager module 120 of the proxy license server 116. The license agents 122 may persist such license information in a kernel space or process memory (e.g., to avoid user accessibility and thus avoid license leakage) of the MPIO drivers 112-1, 112-2, . . . 112-N of the production hosts 102. The license agents 122 are configured, when software being licensed is utilized on the production hosts 102, to access the kernel space or process memory to determine whether the production hosts 102 have been licensed by the proxy license server 116. In some embodiments, the proxy license server 116 sets the license status in the kernel space or process memory as a Boolean (e.g., 1 if a given production host 102 is licensed, 0 otherwise) along with other license information such as license expiry, license issue date, license renewal date, etc. If the license agent 122 determines that the production host 102 is not licensed, the software being licensed may have its features restricted (e.g., a basic version of the software may be used, with some functionality locked or not enabled). The license agents 122 may also be configured to renew licenses with the proxy license server 116 (e.g., at regular intervals, on-demand or user request, etc.). It should be noted that a "license agent" as this term is generally used herein may comprise an automated entity, such as a software entity running on a processing device. Accordingly, a license agent need not be a human entity.

The proxy license server 116 is implemented by the MPIO driver 112-M running on the management host 102-M, which is assumed to comprise a different physical or virtual computing device than the production hosts 102. The proxy license server 116 implemented by the MPIO driver 112-M of the management host 102-M runs between the license server 101 and software (e.g., path selection logic 114-1, 114-2, . . . 114-N) in the MPIO drivers 112-1, 112-2, . . . 112-N of the production hosts 102 to coordinate software or other product licensing across the production hosts 102 in the data center or other enterprise system.

The proxy license server 116 is loaded or provisioned (e.g., by the license server 101) with a number of licenses for a particular piece of software (e.g., the path selection logic 114-1, 114-2, . . . 114-N running on the MPIO drivers 112-1, 112-2, . . . 112-N of the production hosts 102), and connects to the production hosts 102 for licensing using secure socket communication. The host licenses of the production hosts 102 are renewed at regular intervals, such as on expiration of a designated time period from a time at which the host license was most recently renewed (e.g., one day, one week, one month, etc.), at a designated time interval (e.g., at noon every day, every Monday, the first day of each month, etc.) regardless of when the host license was most recently renewed, etc. Renewal of the host licenses may also be performed on-demand such as via user requests submitted to the license interface module 118 of the proxy license server 116 implemented by the MPIO driver 112-M of the management host 102-M. This model for host and software independent licensing enables licensing of any software or other product used by the MPIO drivers 112-1, 112-2, . . . 112-N of the production hosts 102 (e.g., not just the path selection logic 114-1, 114-2, . . . 114-N), and more generally may be used to license other software or products such as the MPIO drivers 112-1, 112-2, . . . 112-N themselves, or additional software or other products of the production hosts 102.

The license server 101 is assumed to issue a pool of licenses (e.g., x licenses) to the proxy license server 116 for use by the production hosts 102 in a particular data center or other enterprise system. The proxy license server 116 is configured to provision the x licenses to any x of the production hosts 102 as needed.

Advantageously, use of the proxy license server 116 avoids the need for re-generating licenses related to host re-imaging. The licenses can be shared across the production hosts 102 (e.g., which may utilize different platforms such as different operating systems (OSes), different hardware, different products, etc.). Further, the production hosts 102 do not need to implement licensing modules that communicate with the license server 101 (or any other entity outside an associated data center or other enterprise system) in order to utilize the MPIO drivers 112-1, 112-2, . . . 112-N and software or other products thereof such as the path selection logic 114-1, 114-2, . . . 114-N. Thus, the production hosts 102 can function and work independently of licensing upgrades, in contrast with conventional techniques where such a licensing module is required. Further, there is no need for a public network connection between the proxy license server 116 (or more generally the MPIO driver 112-M or management host 102-M) and the license agents 122-1, 122-2, . . . 122-N implemented by the MPIO drivers 112-1, 112-2, . . . 112-N of the production hosts 102. A private network connection internal to the data center or other enterprise system in which the production hosts 102 run may be used for establishing secure socket communications between the proxy license server 116 and the license agents 122.

In some embodiments, the management host 102-M (comprising the MPIO driver 112-M implementing the proxy license server 116) and the production hosts 102 (comprising the MPIO drivers 112-1, 112-2, . . . 112-N implementing the license agents 122-1, 122-2, . . . 122-N) are on a "private" network of the data center or other enterprise system (e.g., that is not accessible by the license server 101). The private network may be used to secure communications when the MPIO drivers 112-1, 112-2, . . . 112-N of the production hosts 102 and the proxy license server 116 implemented by the MPIO driver 112-M of the management host 102-M initiate connections to perform licensing tasks such as renewing licenses or communicating license status of the MPIO drivers 112-1, 112-2, . . . 112-N of the production hosts 102. It should be appreciated, however, that such a private network connection is not a requirement. In some cases, given the potentially large scale of production hosts 102 with MPIO drivers 112-1, 112-2, . . . 112-N having licenses managed by the proxy license server 116 implemented by the MPIO driver 112-M of the management host 102-M, the costs of allocating a private network strictly for the purposes of such communication is prohibitive. Thus, an operator of the data center in which the production hosts 102 and management host 102-M operate may desire an alternative for establishing trust between the production hosts 102 and management host 102-M (e.g., between the license agents 122-1, 122-2, . . . 122-N implemented by MPIO drivers 112-1, 112-2, . . . 112-N and the proxy license server 116 implemented by the MPIO driver 112-M), such as by leveraging a secure protocol.

In some embodiments, the production hosts 102 and management host 102-M share or utilize secure socket communications for licensing tasks performed by the license agents 112 and proxy license server 116. The proxy license server 116 is implemented on the management host device 102-M that resides in the same network subnet as the production hosts 102 that it manages. Secure socket communication in the network subnet is then used in communication for licensing tasks described herein. In some embodiments, the secure socket communication is established using OpenSSL, which provides mutual authentication using server (e.g., proxy license server 116) and client (e.g., licensing agents 112) certificates and handshakes for establishing the socket connection. In other embodiments, other types of secure socket communication may be utilized.

The MPIO driver 112-M of the management host 102-M may be integrated with a management appliance (e.g., a PowerPath® Management Appliance suitably modified to provide the functionality described herein) that has secure socket communication with the MPIO drivers 112-1, 112-2, . . . 112-N of the production hosts 102 (e.g., PowerPath® hosts). This secure socket communication is leveraged for licensing tasks. Thus, there is no additional requirement for having a dedicated private network for licensing tasks. It should be noted, however, that a dedicated private network may be used in some embodiments if desired.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112, path selection logic 114, proxy license server 116, license interface 118, license manager 120 and license agents 122 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
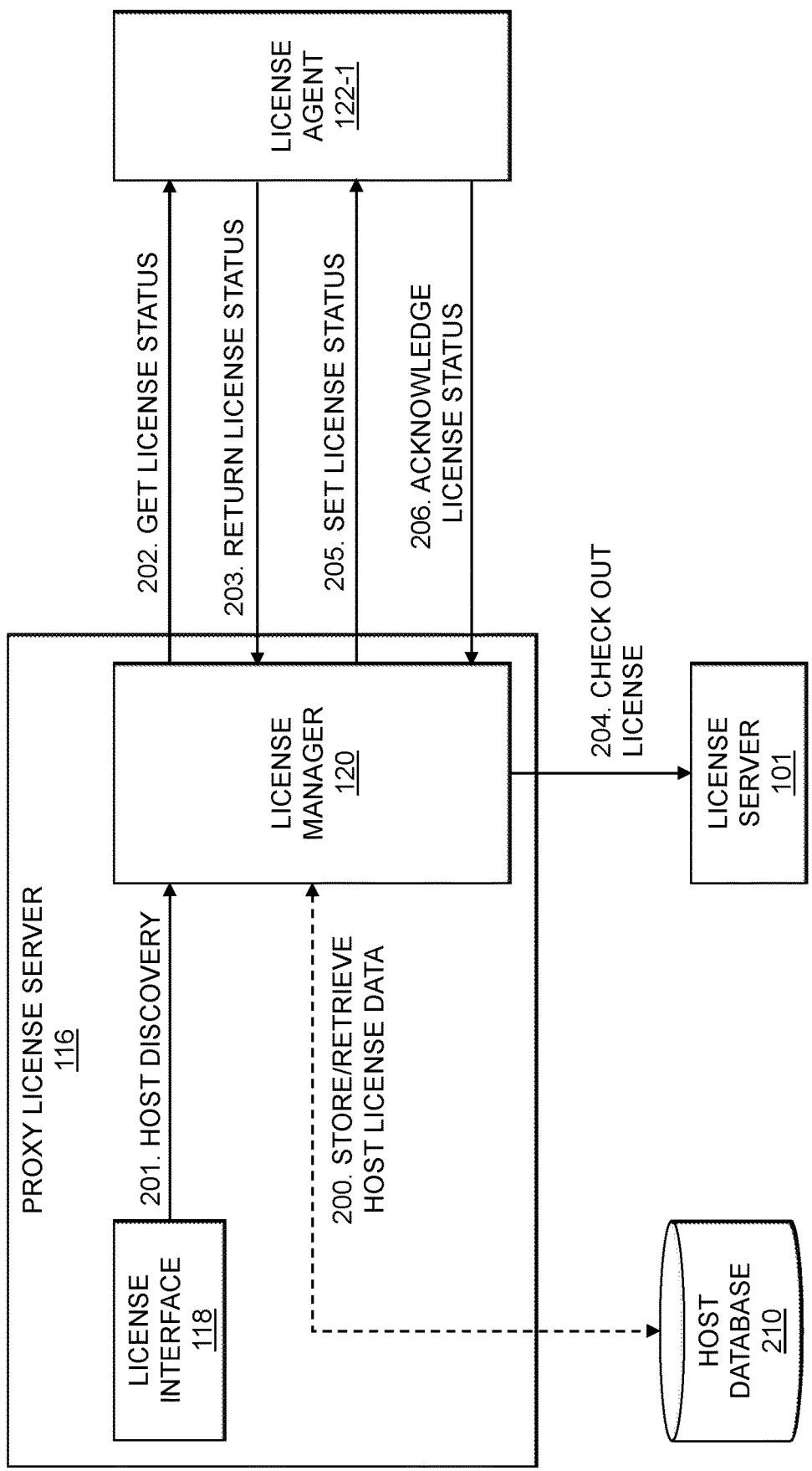
FIG. 2 is a system flow illustrating a process for performing the host-based software licensing of the multi-path input-output drivers in the FIG. 1 information processing system in an illustrative embodiment.

FIG. 2 illustrates a system flow in the information processing system 100 for provisioning a host license in a given one of the production hosts 102-1. For clarity of illustration, certain elements of the FIG. 1 system are omitted in FIG. 2. The system flow begins in step 201, where the license interface module 118 of the proxy license server 116 implemented by the MPIO driver 112-M of the management host 102-M performs host discovery of available production hosts 102 in a data center or other enterprise system (e.g., that implement MPIO drivers 112-1, 112-2, . . . 112-N with licensing managed by the management host 102-M). In step 202, on discovering the production host 102-1, the license manager module 120 of the proxy license server 116 implemented by the MPIO driver 112-M of the management host 102-M gets the license status of the MPIO driver 112-1 (or particular software or products thereof, such as path selection logic 114-1) utilizing the license agent 122-1 implemented by the MPIO driver 112-1 of the production host 102-1. The license agent 122-1 implemented by the MPIO driver 112-1 of the production host 102-1 returns the license status in step 203.

If the production host 102-1 is in an unlicensed state, the license manager module 120 of the proxy license server 116 implemented by the MPIO driver 112-M of the management host 102-M communicates with the license server 101 to check out a license, if available, in step 204. In step 205, the license manager module 120 of the proxy license server 116 then sets the license status of the MPIO driver 112-1 (or particular software thereof such as path selection logic 114-1) of the production host 102-1 to a licensed state. In response, the license agent 122-1 will license the MPIO driver 112-1 (or particular software thereof such as path selection logic 114-1) of the production host 102-1. The license agent 122-1 implemented by the MPIO driver 112-1 of the production host 102-1 then returns an acknowledgement of the license status to the license manager module 120 of the proxy license server 116 in step 206.

In some embodiments, setting the license status in step 205 includes persisting the license in a kernel space or process memory of the MPIO driver 112-1 of the production host 102-1 to avoid license leakage. This is optional, however, as the use of the proxy license server 116 in some embodiments removes the need for saving license information (e.g., a license key) on each of the MPIO drivers 112-1, 112-2, . . . 112-N of the production hosts 102. Setting the license in step 205 may instead include installing an electronic license on a management appliance of the MPIO driver 112-M on which the proxy license server 116 is implemented (e.g., the proxy license server 116 may be implemented as a service running on the management appliance or MPIO driver 112-M). Once the electronic license is installed on the proxy license server 116, the license manager module 120 of the proxy license server 116 can authorize the MPIO driver 112-1 of the production host 102-1 to utilize the software or other product that is the subject of the installed license (e.g., path selection logic 114-1) without transferring a license key to the MPIO driver 112-1 of the production host 102-1.

The license agent 122-1 implemented by the MPIO driver 112-1 of the production host 102-1 (as well as other ones of the license agents 122-2 through 122-N implemented by MPIO drivers 112-2 through 112-N of production hosts 102-N) communicate with the proxy license server 116 implemented by the MPIO driver 112-M of the management host 102-M at regular intervals to renew licenses. If a particular license agent such as license agent 122-1 is unable to connect to or otherwise communicate with the proxy license server 116 to renew the license as scheduled, there may be a grace period where the associated MPIO driver 112-1 of the production host 102-1 is still permitted to use the software or other product being licensed until the license agent 122-1 is able to connect to the proxy license server 116 to renew the license or until the grace period expires.

FIG. 2 further shows an optional step 200, where the license manager module 120 of the proxy license server 116 stores and/or retrieves host license data from a host database 210. For example, step 200 may be performed by the license manager module 120 to determine which production hosts 102 in the data center or other enterprise system have MPIO drivers or other software that are currently licensed from a pool of available licenses issued by the license server 101 for use by the production hosts 102 in the data center or other enterprise system. This may be performed prior to step 201, such that the license interface module 118 of the proxy license server 116 discovers the particular production hosts 102 in the data center or other enterprise system with MPIO drivers whose licenses should be renewed. Step 200 may further or alternatively be performed before, during or after one or more of steps 201 through 206. For example, after receiving the license status in step 203 or in conjunction with checking out the license in step 204 or setting the license status in step 205, the license manager module 120 of the proxy license server 116 may update host licensing information in the host database 210. As another example, the license manager module 120 of the proxy license server 116 may update host licensing information in the host database 210 after receiving the acknowledgement in step 206.

The proxy license server 116 implemented by the MPIO driver 112-M of the management host 102-M can advantageously be used for managing licensing in situations where a particular piece of software or other product is to be installed on multiple different ones of the MPIO drivers 112-1, 112-2, . . . 112-N of the production hosts 102 in a data center or other enterprise system. It should be appreciated that the proxy license server 116 may be configured to manage licensing for multiple different pieces of software or other products that are used on or by the MPIO drivers 112-1, 112-2, . . . 112-N of the production hosts 102, including the MPIO drivers 112-1, 112-2, . . . 112-N themselves and possibly other software or products external to the MPIO drivers 112-1, 112-2, . . . 112-N on the production hosts 102. The license server 101 may issue multiple pools of licenses for multiple different pieces of software or other products to the proxy license server 116, multiple license servers may each issue one or more pools of licenses for one or more different pieces of software or other products to the proxy license server 116, etc. Further, the proxy license server 116 may be configured to manage licensing for two or more different pieces of software or other products on two or more distinct subsets of the production hosts 102.

Although shown as external to the proxy license server 116 in FIG. 2, the host database 210 may be implemented at least in part internal to the proxy license server 116 in some embodiments.

Figure 3:
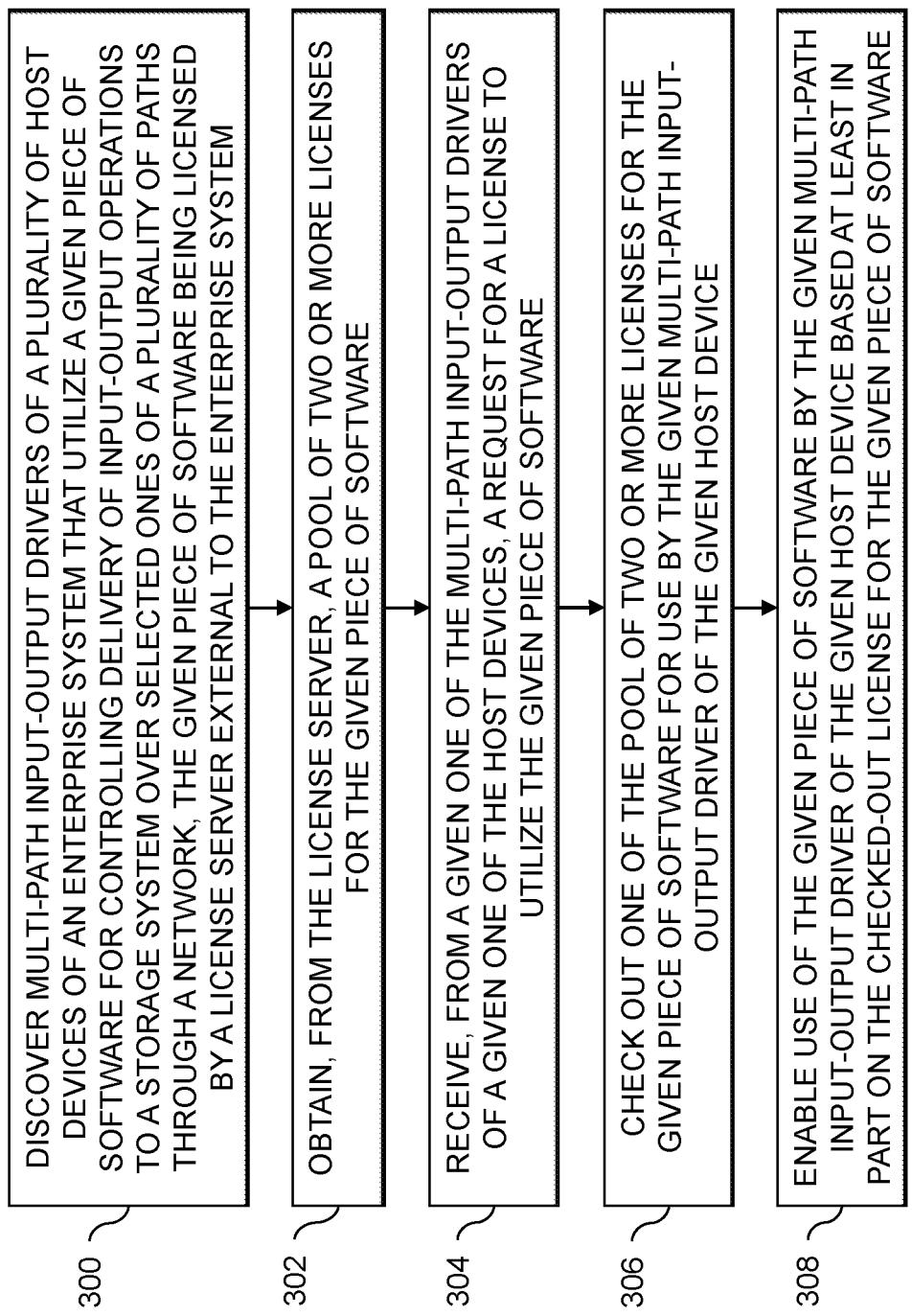
FIG. 3 is a flow diagram of an exemplary process for host-based software licensing of multi-path input-output drivers in an illustrative embodiment.

An exemplary process for host-based software licensing of multi-path input-output drivers will now be described in more detail with reference to the flow diagram of FIG. 3. It is to be understood that this particular process is only an example, and that additional or alternative processes for host-based software licensing of multi-path input-output drivers may be used in other embodiments.

In this embodiment, the process includes steps 300 through 308. The process begins with step 300, discovering multi-path input-output drivers (e.g., 112-1, 112-2, . . . 112-N) of a plurality of host devices (e.g., production hosts 102) of an enterprise system that utilize a given piece of software (e.g., path selection logic 114-1, 114-2, . . . 114-N) for controlling delivery of input-output operations to a storage system (e.g., storage array 105) over selected ones of a plurality of paths through a network (e.g., SAN 104), the given piece of software being licensed by a license server (e.g., license server 101) external to the enterprise system. The FIG. 3 process, in some embodiments, is assumed to be performed using the proxy license server 116 implemented by the MPIO driver 112-M of the management host 102-M that is on a same subnet of an internal network of the enterprise system as the production hosts 102. The MPIO driver 112-M may comprise a management appliance that manages the MPIO drivers 112-1, 112-2, . . . 112-N of the production hosts 102 in the enterprise system.

Step 300 may include utilizing secure socket communications in the internal network of the enterprise system. The secure socket communications may utilize mutual authentication based at least in part on a server certificate (e.g., of the MPIO driver 112-M of the management host 102-M) and client certificates (e.g., of the MPIO drivers 112-1, 112-2, . . . 112-N of the production hosts 102). The MPIO driver 112-M of the management host 102-M that implements the proxy license server 116 performing the FIG. 3 process may be configured to communicate with the MPIO drivers 112-1, 112-2, . . . 112-N of the production hosts 102 over a private network not accessible to the license server 101.

In step 302, a pool of two or more licenses for the given piece of software is obtained from the license server 101. A request for a license to utilize the given piece of software is received in step 304 from a given MPIO driver (e.g., MPIO driver 112-1) of a given one of the production hosts (e.g., host device 102-1). In step 306, one of the pool of licenses for the given piece of software is checked out for use by the given MPIO driver 112-1 of the given production host 102-1. Use of the given piece of software by the given MPIO driver 112-1 of the given production host 102-1 is enabled in step 308 based at least in part on the checked-out license for the given piece of software.

In some embodiments, step 308 includes setting a license status of the given MPIO driver 112-1 without transferring a license key to the given MPIO driver 112-1. In other embodiments, step 308 further or alternatively includes persisting a license status of the given MPIO driver 112-1 in at least one of a kernel of the given production host 102-1 and a process memory of the given production host 102-1. The FIG. 3 process may further include periodically renewing the checked-out license for the given MPIO driver 112-1 of the given production host 102-1, such as on receiving a renewal request from the given MPIO driver 112-1 responsive to expiration of a designated period of time. The MPIO driver 112-M implementing the proxy license server 116 performing the FIG. 3 process may be further configured to update the pool of two or more licenses issued by the license server 101 while maintaining license status of ones of the MPIO drivers 112-1, 112-2, . . . 112-N of the production hosts 102 with checked-out ones of the pool of two or more licenses.

The pool of two or more licenses obtained in step 302 may be issued for the production hosts 102 collectively, such that a given one of the pool of two or more licenses is configured to be checked-out for use by a first one of the MPIO drivers 112-1, 112-2, . . . 112-N of a first one of the production hosts 102 for a first period of time and to be checked-out for use by a second one of the MPIO drivers 112-1, 112-2, . . . 112-N of a second one of the production hosts 102 for a second period of time. The pool of two or more licenses may further be independent of the hardware and/or software platform configurations of the production hosts 102, such that a given one of the licenses may be used at different times for different ones of the production hosts 102 with different hardware configurations, different software platform configurations, or different hardware and software platform configurations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for host-based software licensing of MPIO drivers will now be described in greater detail with reference to FIGS. 4 and 5. Although described in the context of system 100, these platforms may also be used to implement at least portions of other information processing systems in other embodiments.

Figure 4:
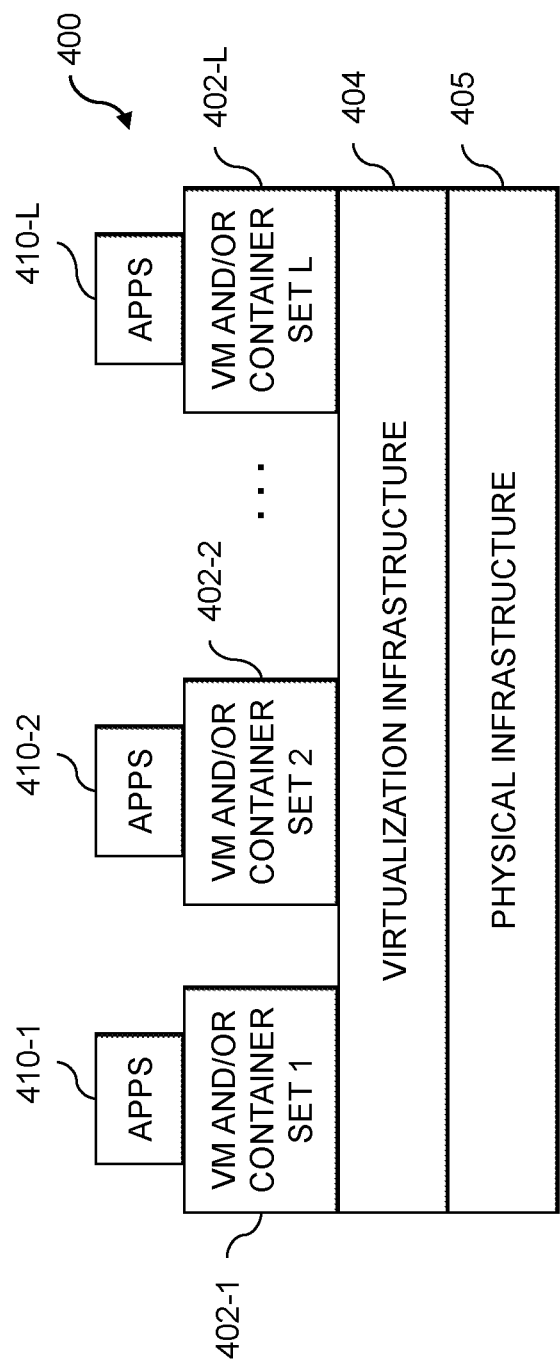
FIGS. 4 and 5 show examples of processing platforms that may be utilized to implement at least a portion of an information processing system in illustrative embodiments.
Figure 5:
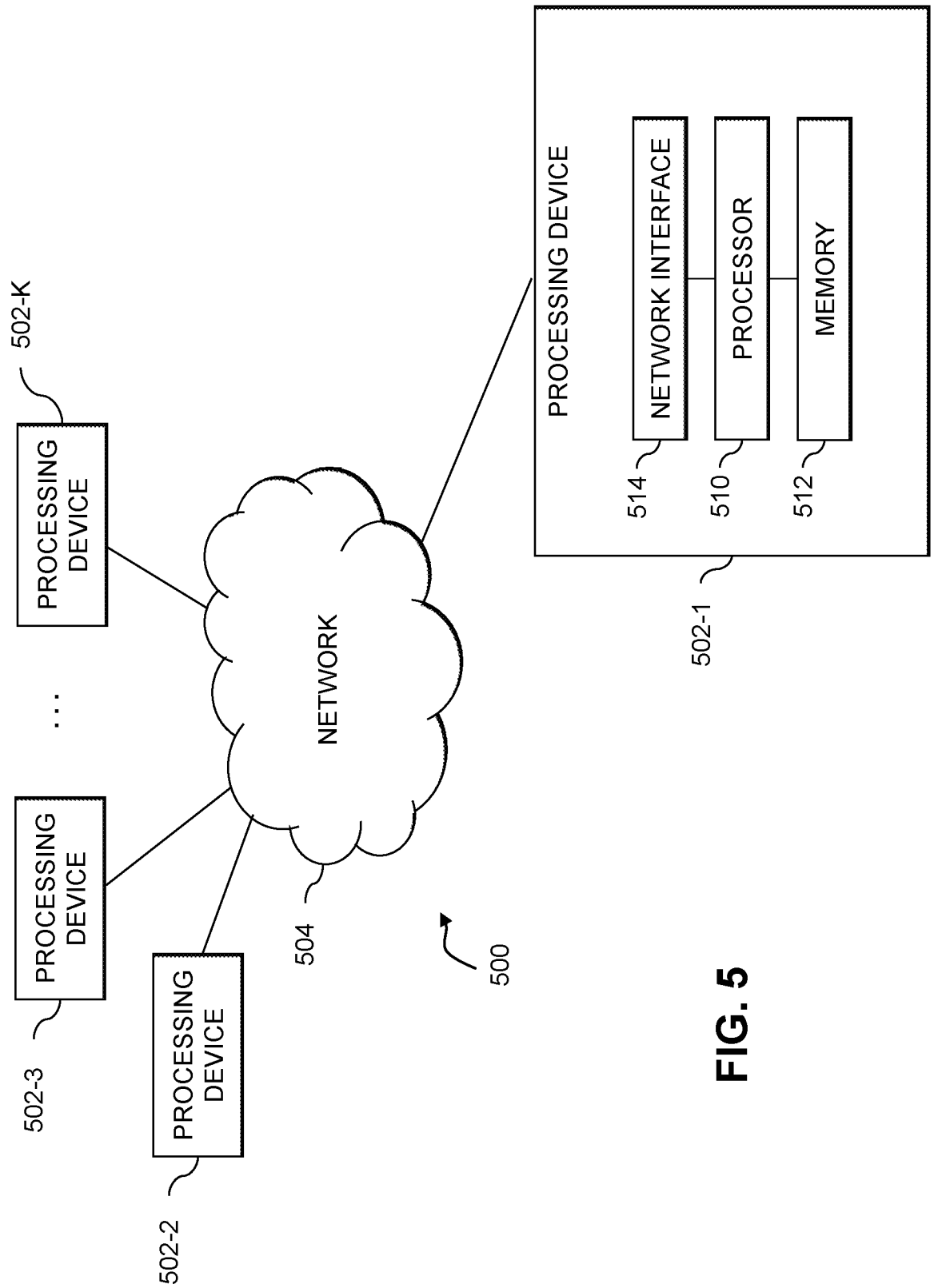

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for host-based software licensing of MPIO drivers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, licensing models, proxy license servers, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    a first host device of a plurality of host devices in an information technology infrastructure configured to communicate over a first network with a storage system comprising a plurality of storage devices;
    the first host device comprising a first multi-path input-output driver configured:
        to discover, over the first network, one or more additional multi-path input-output drivers of one or more additional ones of the plurality of host devices of the enterprise system information technology infrastructure that utilize a given piece of software for controlling delivery of input-output operations to the storage system over selected ones of a plurality of paths through the network, the given piece of software being licensed by a license server external to the information technology infrastructure;
        to obtain, from the license server via a second network different than the first network, a pool of two or more licenses for the given piece of software;
        to receive, over the first network from a given one of the additional multi-path input-output drivers of a given one of the additional host devices, a request for a license to utilize the given piece of software;
        to check out one of the pool of two or more licenses for the given piece of software for use by the given additional multi-path input-output driver of the given additional host device; and
        to enable, via communication over the first network, use of the given piece of software by the given additional multi-path input-output driver of the given additional host device based at least in part on the checked-out license for the given piece of software;
    wherein enabling use of the given piece of software by the given additional multi-path input-output driver of the given additional host device comprises persisting a license status of the given additional multi-path input-output driver in at least one of a kernel of the given additional host device and a process memory of the given additional host device.

2. The apparatus of claim 1 wherein the plurality of host devices are on a same subnet of the first network, the first network comprising an internal network of managed by an operator of the information technology infrastructure.

3. The apparatus of claim 1 wherein discovering the one or more additional multi-path input-output drivers comprises utilizing secure socket communications in the first network, the first network comprising an internal network of managed by an operator of the information technology infrastructure.

4. The apparatus of claim 3 wherein the secure socket communications utilize mutual authentication based at least in part on a server certificate of the first multi-path input-output driver of the first host device and client certificates of the one or more additional multi-path input-output drivers of the one or more additional host devices.

5. The apparatus of claim 1 wherein the first network comprises a private network not accessible to the license server.

6. The apparatus of claim 1 wherein enabling use of the given piece of software by the given additional multi-path input-output driver of the given additional host device based at least in part on the checked-out license comprises setting a license status of the given additional multi-path input-output driver without transferring a license key to the given additional multi-path input-output driver.

7. The apparatus of claim 1 wherein the first multi-path input-output driver comprises a management appliance configured to manage the one or more additional multi-path input-output drivers of the one or more additional host devices providing respective production hosts for the given piece of software in the information technology infrastructure.

8. The apparatus of claim 1 wherein the first multi-path input-output driver is further configured to perform the step of periodically renewing the checked-out license for the given additional multi-path input-output driver of the given additional host device.

9. The apparatus of claim 8 wherein periodically renewing the checked-out license comprises receiving a renewal request from the given additional multi-path input-output driver responsive to expiration of a designated period of time.

10. The apparatus of claim 1 wherein the pool of two or more licenses is issued for the plurality of host devices collectively, and wherein a given one of the pool of two or more licenses is configured to be checked-out for use by a first one of the one or more additional multi-path input-output drivers of a first one of the one or more additional host devices for a first period of time and to be checked-out for use by a second one of the one or more additional multi-path input-output drivers of a second one of the one or more additional host devices for a second period of time.

11. The apparatus of claim 1 wherein the pool of two or more licenses is issued independent of hardware configurations of the plurality of host devices, and wherein a given one of the pool of two or more licenses is configured to be checked-out for use by a first one of the one or more additional multi-path input-output drivers of a first one of the one or more additional host devices with a first hardware configuration for a first period of time and to be checked-out for use by a second one of the one or more additional multi-path input-output drivers of a second one of the one or more additional host devices with a second hardware configuration for a second period of time.

12. The apparatus of claim 1 wherein the pool of two or more licenses is issued independent of software platform configurations of the plurality of host devices, and wherein a given one of the pool of two or more licenses is configured to be checked-out for use by a first one of the one or more additional multi-path input-output drivers of a first one of the one or more additional host devices with a first software platform configuration for a first period of time and to be checked-out for use by a second one of the one or more additional multi-path input-output drivers of a second one of the one or more additional host devices with a second software platform configuration for a second period of time.

13. The apparatus of claim 1 wherein the first multi-path input-output driver is further configured to update the pool of two or more licenses issued by the license server while maintaining license status of ones of the one or more additional multi-path input-output drivers of ones of the one or more additional host devices with checked-out ones of the pool of two or more licenses.

14. A method comprising steps of:
configuring a first multi-path input-output driver of a first one of a plurality of host devices of an information technology infrastructure to discover, over a first network, one or more additional multi-path input-output drivers of one or more additional ones of the plurality of host devices of the information technology infrastructure that utilize a given piece of software for controlling delivery of input-output operations to a storage system over selected ones of a plurality of paths through the first network, the given piece of software being licensed by a license server external to the information technology infrastructure;
obtaining, by the first multi-path input-output driver from the license server via a second network different than the first network, a pool of two or more licenses for the given piece of software;
receiving, over the first network at the first multi-path input-output driver from a given one of the additional multi-path input-output drivers of a given one of the additional host devices, a request for a license to utilize the given piece of software;
checking out, by the first multi-path input-output driver, one of the pool of two or more licenses for the given piece of software for use by the given additional multi-path input-output driver of the given additional host device; and
enabling, via communication over the first network, use of the given piece of software by the given additional multi-path input-output driver of the given additional host device based at least in part on the checked-out license for the given piece of software;
wherein enabling use of the given piece of software by the given additional multi-path input-output driver of the given additional host device comprises persisting a license status of the given additional multi-path input-output driver in at least one of a kernel of the given additional host device and a process memory of the given additional host device.

15. The method of claim 14 wherein the first network comprises a private network not accessible to the license server.

16. The method of claim 14 wherein the pool of two or more licenses is issued for the plurality of host devices collectively, and wherein a given one of the pool of two or more licenses is configured to be checked-out for use by a first one of the one or more additional multi-path input-output drivers of a first one of the one or more additional host devices for a first period of time and to be checked-out for use by a second one of the one or more additional multi-path input-output drivers of a second one of the one or more additional host devices for a second period of time.

17. A computer program product comprising a non-transitory processor-readable storage medium having stored therein program code of one or more software programs, wherein the program code when executed by a first one of a plurality of host devices of an information technology infrastructure comprising a first multi-path input-output driver, causes the first multi-path input-output driver:
to discover, over a first network, one or more additional multi-path input-output drivers of one or more additional ones of the plurality of host devices of the information technology infrastructure that utilize a given piece of software for controlling delivery of input-output operations to a storage system over selected ones of a plurality of paths through the first network, the given piece of software being licensed by a license server external to the information technology infrastructure;

to obtain, from the license server via a second network different than the first network, a pool of two or more licenses for the given piece of software;

to receive, over the first network a from a given one of the additional multi-path input-output drivers of a given one of the additional host devices, a request for a license to utilize the given piece of software;

to check out one of the pool of two or more licenses for the given piece of software for use by the given additional multi-path input-output driver of the given additional host device; and to enable, via communication over the first network, use of the given piece of software by the given additional multi-path input-output driver of the given additional host device based at least in part on the checked-out license for the given piece of software;

wherein enabling use of the given piece of software by the given additional multi-path input-output driver of the given additional host device comprises persisting a license status of the given additional multi-path input-output driver in at least one of a kernel of the given additional host device and a process memory of the given additional host device.

18. The computer program product of claim 17 wherein the first network comprises a private network not accessible to the license server.

19. The computer program product of claim 17 wherein the pool of two or more licenses is issued for the plurality of host devices collectively, and wherein a given one of the pool of two or more licenses is configured to be checked-out for use by a first one of the one or more additional multi-path input-output drivers of a first one of the one or more additional host devices for a first period of time and to be checked-out for use by a second one of the one or more additional multi-path input-output drivers of a second one of the one or more additional host devices for a second period of time.

20. The computer program product of claim 17 wherein the pool of two or more licenses is issued independent of hardware and software configurations of the plurality of host devices, and wherein a given one of the pool of two or more licenses is configured to be checked-out for use by a first one of the one or more additional multi-path input-output drivers of a first one of the one or more additional host devices with a first hardware and software configuration for a first period of time and to be checked-out for use by a second one of the one or more additional multi-path input-output drivers of a second one of the one or more additional host devices with a second hardware and software configuration for a second period of time.

* * * * *